3,138,463
ANTI-SPATTERING DRY SHORTENING COMPOSITION

James C. Wootton, Springfield Township, Hamilton County, Ohio, assignor to The Procter & Gamble Company, Cincinnati, Ohio, a corporation of Ohio
No Drawing. Filed Nov. 22, 1961, Ser. No. 154,317
10 Claims. (Cl. 99—118)

This invention relates to an improved dry shortening composition. More particularly, it relates to an anti-spattering dry shortening containing small amounts of partial esters of pentitols and hexitols with long chain fatty acids.

Many foods which are frequently prepared by frying have a high moisture content. During the pan frying of these foods, especially during the early period of the heating, the contact between the relatively cool moisture of the food and the hot fat of the cooking vessel produces sudden vaporization of water into steam which in turn causes spattering of fat particles.

Various substances have previously been suggested as anti-spattering agents for use in the frying of foods. Some of them are useful in products having an oil-in-water emulsion, like margarine, wherein they reduce the spattering caused by the sudden break-up of the said emulsion. Unless the margarine contains an emulsifying agent, the application of heat causes its oil-in-water emulsion to break up and form large drops of water. The sudden escape of steam from these drops of water expels fat particles with sufficient explosive force so as to cause spattering. The said spattering occurs during the heating of the margarine in the pan even before the addition of any food to be fried therein. Typical of the anti-spattering agents for margerine emulsions are the sodium sulfoacetate derivatives of mono- and diglycerides and others such, for example, as those described in U.S. Patents 1,917,249 through 1,917,260 inclusively.

The particular type of spattering caused by margarine, however, is not an attribute of the present shortening compositions which are dry and have no oil-in-water emulsion. The present invention concerns spattering caused by the moisture contained in the food rather than in the frying fat of the cooking vessel. Spattering caused by the contact betwen cold, moist food and hot frying fat presents a problem unrelated to the problem of spattering caused by the sudden break-up of an emulsion such as in margarine.

Various additives, particularly a number of polyhydric substances, show anti-spattering activity when incorporated into shortenings but are unsatisfactory for compositions of this invention because their anti-spattering activity is accompanied by considerable foaming during frying. For example, among those compounds possessing some anti-spattering activity but showning objectionable foaming during frying even at less than 1% concentration are the hexose fatty acid esters such, for example, as the sucrose and maltose fatty acid esters, including sucrose partial oleate, maltose partial palmitate, and the like; alicyclic fatty acid esters such as those derived from inositol; and fatty acid esters of ascorbic acid.

Other undesirable properties produced by various anti-spattering additives are poor color, flavor, odor or smoking and the like.

A number of other substances which have anti-spattering properties have previously been incorporated into shortenings in levels which provide substantial improvement in cake baking performance but which do not exhibit the superior frying characteristics of the present invention. For example, U.S. Patent 2,132,398, granted to Coith, Richardson, and Votaw, October 11, 1938, discloses that the addition of at least 2% of certain polyhydroxy substances partially esterified with higher fatty acids provides substantial improvement in the cake baking properties of a shortening. While some of the said substances have now been found to have anti-spattering properties, those skilled in the art have not heretofore discovered that such properties are exhibited at levels less than 1% of the total shortening nor have they disclosed the undesirable foaming tendencies at the 1% and higher levels of incorporation. The present invention is based on the discovery that a certain group of polyhydroxy esters provides efficient anti-spattering properties without objectionable foaming during frying when incorporated into a dry shortening in amounts less than 1%.

Accordingly, it is an object of the present invention to provide an improved dry shortening composition which overcomes, or to a large extent counteracts, the tendency to spatter during the frying of wet foods.

It is another object to provide a dry shortening composition containing anti-spattering agents which does not produce undesirable foaming during frying.

It is a further object to incorporate an anti-spattering agent into a dry shortening composition without thereby introducing undesirable shortening properties such as poor color, flavor, odor and the like.

It is still a further object to provide a non-spattering dry shortening composition which can be used for pan or deep frying as well as for the other conventional uses of shortening such as cake baking, pastry making and the like.

Yet another object is to provide a dry shortening composition containing partial esters of pentitols and hexitols with long chain fatty acids as anti-spattering agents.

With these objects in view, together with such other objects and advantages which will be readily apparent, the invention is carried into effect by the employment of certain substances and the treatment thereof as hereinafter described and particularly defined in the appended claims.

It has now been discovered that when certain partial esters of particular polyols with various fatty acids are appropriately incorporated into dry shortenings there is a substantial reduction in spattering without objectionable foaming during frying. The particular polyols which have been found uniquely suited for the purposes of this invention are the pentitols and hexitols. The said polyols are straight chain polyhydroxy alcohols having 5 carbon atoms in the molecule, such as adonitol and arabitol, or 6 carbon atoms such as mannitol and sorbitol. An important characteristic of the partial esters of these polyols is the presence in the molecule of two types of groups, one of them being the hydrophilic hydroxy group and the other being a lipophilic fatty acid group.

In accordance with this invention it is essential that the partially esterified polyol contain in each molecule at least four unesterified and uncombined hydroxy groups and at least one long chain saturated or unsaturated fatty acid group having about 12 to 22 carbon atoms.

It has been found that a shortening composition which contains about 0.3% to 0.9% by weight of the above-described partial esters displays the remarkable anti-spattering properties of this invention with negligible foaming. While higher concentrations of the partial esters do not increase the anti-spattering properties of the shortening, they do produce substantial foaming. In addition, certain other desirable effects are achieved by the use of these esters during frying. Food sticking to the cooking utensil is substantially eliminated and, as a result, cleaning of utensils after frying is considerably easier. Moreover, the esters tend to act as hot oil stabilizers during deep frying.

While it cannot be said that all other hydroxyl fatty esters are without anti-spattering action, a number of them have been found to be ineffective and none of them compare favorably in overall efficiency with the esters of this invention. For example, among those hydroxyl fatty esters found to be ineffective anti-spattering agents for dry shortenings are the erythritol and pentaerythritol esters such, for example, as the monostearate, distearate and monoacetyl monstearate esters thereof; esters of lower polyhydric alcohols such, for example, as diethylene glycol monostearate and the mono- and diglycerides of fatty acids; hexitol esters with less than four unesterified hydroxy groups, such as sorbitol tripalmitate; esters of the anhydrides of hexahydric alcohols, such as sorbitan monostearate; and esters of the oxidation products of polyhydric alcohols such as the citric acid esters.

The following examples will illustrate the present invention, but it will be understood that the invention is not limited thereto, other variations being readily discernible to those skilled in the art after reading the description of the invention described herein.

EXAMPLE 1

To a stirred solution of 36.4 g. (0.2 mol) of sorbitol and 27.0 g. (0.1 mol) of methyl palmitate in 300 ml. of pyridine were added 10 ml. of a suspension of sodium methoxide in xylene (0.089 g. per ml.). After heating the mixture at 100° C. for one hour, the catalyst was inactivated by the addition of 2 ml. of glacial acetic acid. The pyridine was then removed by vacuum distillation. The residue was suspended in one liter of ether, water washed four times, and filtered, whereby a highly pure product of white crystalline sorbitol monopalmitate was obtained.

A series of shortening compositions was prepared by incorporating the aforesaid sorbitol monopalmitate into a plastic shortening consisting of about 94% of a mixture of 17 parts of soybean oil and 3 parts of cottonseed oil hardened to an Iodine Value of about 70 and blended with about 6% of saturated cottonseed oil.

The reduction in spattering attributable to the sorbitol monopalmitate additive was determined by frying a wet food in the shortening according to the following procedure: a frying pan 4 inches in diameter and 1 inch in depth was placed on a hotplate. A flat one-foot-square sheet of aluminum foil with a 4-inch hole in the center was fitted tightly around the sides of the pan and close to its top so that it extended outwardly therefrom in all directions of a horizontal plane. Five g. of the shortening composition to be tested were placed in the pan and heated to a temperature of about 175° C. After two minutes of heating, three pieces of cold moist scallop, which were about 25 mm. in diameter and which were freshly cut from partially defrosted scallops, were placed in the pan and fried 1½ minutes on each side. The amount of spattering which collected on the aluminum foil was calculated by taking the difference between the weight of the foil before and after frying. The following table records the results obtained by this procedure using various levels of sorbitol monopalmitate additive as the anti-spattering agent in shortening.

*Table 1*

| Anti-Spattering Agent (Percent Additive in 5 g. shortening) | Grams of Fat Spattered | Percent Reduction in Spattering |
|---|---|---|
| 0 | 0.50 | |
| .2 | 0.33 | 34 |
| .5 | 0.06 | 88 |
| .75 | 0.01 | 98 |
| 1.0 | 0.01 | 98 |
| 1.5 | 0.01 | 98 |

Foaming during the said frying was appreciable only with concentrations of about 1% and greater.

EXAMPLE 2

A three-necked flask fitted with a sealed stirrer, a reflux condenser with drying tube, and a thermometer, was charged with 150 g. (0.5 mol) of refined palm oil, 90 g. (1.5 mols) of anhydrous sorbitol, 1.5 g. of powdered potassium hydroxide and 500 ml. of dimethylformamide. This mixture, which was kept completely free of moisture and glucose or other reducing sugars, was heated with stirring to 100°–110° C. for 45 minutes. The mixture was then cooled to below 100° C. and 7 ml. of 50% aqueous acetic acid were added to inactivate the catalyst. Upon further cooling to below 60° C., the mixture was added to 1 liter of a 1:4 butanol and ethyl acetate solvent. After washing this mixture three times with 1 liter of warm water, the said solvent was removed by distillation. The remaining solid mass was then heated and stirred in 1 liter of acetone for about two hours at 50° C. until a finely divided white insoluble product of the sorbitol triglyceride alcoholysis reaction was obtained. The said acetone insoluble fraction was filtered, washed with 50 ml. of warm acetone and dried by heating to 60° C. under reduced pressure (5–10 mm. Hg) for about one hour.

Sorbitol triglyceride ester reaction products of various hardened fatty oils were similarly prepared by substituting substantially full hydrogenated triglyceride oils (8 I.V.) for a proportional amount of the refined palm oil used above. The hardened oils used were those derived from coconut oil, palm oil, cottonseed oil, and rapeseed oil. The insoluble alcoholysis reaction products had a sorbitol monoester content ranging from about 70% to 80%.

A series of shortening compositions was prepared by incorporating 1% of the said insoluble sorbitol triglyceride ester reaction products from each of the above oils into a separate sample of hydrogenated vegetable oil shortening consisting primarily of hydrogenated soybean oil (I.V. 70–75) and minor amounts of hardstock and monoglyceride emulsifiers. This 1% additive level was equivalent to a range of about 0.7% to 0.8% active sorbitol monoester.

The reduction in spattering attributable to the sorbitol monoester additives was determined by adding water to the hot shortening composition under controlled conditions as follows: a frying pan 7 inches in diameter was placed on a hotplate. A flat piece of aluminum foil with a 7-inch hole in the center was fitted tightly around the sides of the pan so that it extended 3 inches outwardly therefrom in all directions of a horizontal plane and thence upward to about 12 inches above the pan. 25 g. of the shortening composition to be tested were placed in the pan and heated to an oil temperature of about 360° F. 0.2 ml. of water was then forced dropwise by a constant pressure through a 200λ micro pipette having its tip firmly centered about 14 inches above the surface of the pan. Heating was continued until spattering stopped. The amount of spattering which collected on the alumnium foil was determined by calculating the difference in weight of the aluminum foil before and after spattering. The following table records the results obtained by this procedure using the aforesaid sorbitol monoesters as the active anti-spattering additives in shortening.

*Table II*

| Anti-Spattering Agent | Grams of Fat Spattered | Percent Reduction in Spattering |
|---|---|---|
| Shortening control w/o anti-spattering additive | 0.85 | |
| Sorbitol monoester of refined palm oil | 0.15 | 82 |
| Sorbitol monoester of hardened coconut oil | 0.12 | 86 |
| Sorbitol monoester of hardened palm oil | 0.16 | 81 |
| Sorbitol monoester of hardened cottonseed oil | 0.18 | 79 |
| Sorbitol monoester of hardened rapeseed oil | 0.27 | 67 |

EXAMPLE 3

A series of shortening compositions was prepared by incorporating various amounts of the sorbitol monopalmitate prepared in accordance with Example 1, above, into a hydrogenerated vegetable oil shortening consisting primarily of hydrogenated soybean oil (I.V. 70–75) and minor amounts of hardstock and monoglyceride emulsifiers.

The reduction in spattering attributable to the sorbitol monopalmitate additive was determined according to the precedure described in Example 2, above.

The following table records the results obtained by this procedure using various levels of sorbitol monopalmitate as the anti-spattering additive in shortening.

Table III

| Anti-Spattering Agent (Percent Additive in 25 g. shortening) | Grams of Fat Spattered | Percent Reduction in Spattering |
| --- | --- | --- |
| 0 | 0.74 | |
| 0.3 | 0.35 | 53 |
| 0.5 | 0.20 | 73 |
| 0.6 | 0.14 | 80 |
| 0.7 | 0.06 | 92 |
| 0.8 | 0.09 | 88 |
| 0.9 | 0.07 | 92 |
| 1.0 | 0.06 | 92 |
| 1.5 | 0.05 | 93 |
| 2.0 | 0.05 | 93 |

The tendency of the aforesaid shortening compositions to foam during the frying of wet foods was determined by frying sliced raw potatoes in samples of these shortenings in a 10-inch Sunbeam Electric Skillet at 320° F. and observing the amount of foam produced thereby. The tendency to foam increased as the concentration of the sorbitol monopalmitate was increased. While no appreciable foaming occurred at concentrations below about 1%, the foaming became conspicuous at about that level and increased substantially at higher concentrations.

EXAMPLE 4

The tendency to foam during the frying of wet foods is shortenings containing sorbitol monopalmitate was determined by a test method as follows: 40 g. of cottonseed oil containing 0.5% of the sorbitol monopalmitate prepared in accordance with Example 1 were placed in a 180 ml. cloud point breaker. The oil was heated to 395° C. and the flame removed. A wire basket containing six potato cylinders ½-inch long and cut with a No. 6 cork borer was dropped into the hot oil. After 1½ minutes had elapsed the height of the foam produced was measured. The identical procedure was repeated with similar test samples of cottonseed oil but containing 1% and 2% of sorbitol monopalmitate. The following table records the results obtained by this procedure.

Table IV

| Sorbitol Monopalmitate (Percent Additive in 40 g. cottonseed oil) | Inches of Foam |
| --- | --- |
| .5 | Negligible. |
| 1.0 | One-half. |
| 2.0 | Foamed over in 1 minute. |

EXAMPLE 5

Adonitol monopalmitate incorporated into a hydrogenated vegetable oil shortening consisting primarily of hydrogenated soybean oil (I.V. 70–75) and minor amounts of hardstock and monoglyceride emulsifiers in levels of ½% and 1% by weight of the total shortening, when tested according to the procedure described in Example 2, above, provided a reduction in spattering of 22% and 56%, respectively, compared to the same shortening without the adonitol monopalmitate additive, and was accompanied with essentially no foaming at the lower level and conspicuous foaming at the higher level.

EXAMPLE 6

A shortening composition was prepared by thoroughly blending 0.75 part by weight of mannitol palmitate into 99.25 parts by weight of a liquid shortening consisting of partially hydrogenated soybean oil (I.V. 107). The said composition provided a spatter-depression in the order of greater than 90% compared to the unblended shortening when 0.2 ml. of water was injected into 25 g. samples of the hot shortening at 360° F.

The data in the aforesaid examples indicate that spattering was considerably reduced without objectionable foaming during frying by incorporating into shortening less than about 1% of various partial esters of hexitols and pentitols with long-chain fatty acids. When arabitol monostearate, mannitol dipalmitate, sorbitol dipalmitate, sorbitol monolaurate, sorbitol mono-oleate and like pentitol monoesters and hexitol mono- and di-esters of fatty acids derived from hydrogenated or unhydrogenated cottonseed oil, soybean oil, palm oil, peanut oil, coconut oil, rapeseed oil, sunflower seed oil, lard and tallow, and mixtures thereof are substituted for the partial esters used in the above examples, comparable reduction in spattering without objectionable foaming is obtained. The said partial esters all contain at least four uncombined and unesterified hydroxy groups as well as at least one long chain fatty acid group. They are preferably prepared in accordance with procedures which substantially avoid the production of esters of anhydrides of the said polyhydric alcohols, since esters having the anhydro group have been found to be ineffective anti-spatter additives in dry shortening. U.S.P. 2,997,492, granted to Martin, August 22, 1961, and U.S.P. 2,997,493, granted to Huber, August 22, 1961, describe useful methods for preparing these esters.

These and like partial esters of the pentitols and hexitols with saturated or unsaturated fatty acids having 12 to 22 carbon atoms, or mixtures thereof, may be intimately admixed with or otherwise suitably incorporated into various dry shortenings in the proportion of 0.3% to 0.9% by weight and preferably in the proportion of 0.7% to 0.8% by weight. For the purposes of this invention it is preferable to use a monoester of sorbitol with a mixture of fatty acids of intermediate chain length, having about 14 to 18 carbon atoms such as found in hydrogenated or unhydrogenated cottonseed oil or palm oil. Sorbitol monopalmitate in a range of about 0.7% to 0.8% by weight, based on the total shortening, produces the best balance between maximum reduction in spattering and minimum amount of foaming during pan frying of wet foods.

Various dry shortening compositions containing the anti-spattering additives of this invention may be used to reduce spattering during frying of wet foods. These shortenings can be plastic, suspensions or liquid oils of vegetable, animal, and marine origin. For example, among those shortenings which may be used in accordance with this invention are the ordinary triglyceride plastic shortenings which generally contain hydrogenated oils and fats; shortenings derived from liquid glyceride oils such, for example, as the naturally occurring liquid cottonseed oil, soybean oil, peanut oil, rapeseed oil, sesame seed oil and sunflower seed oil; shortenings containing triglycerides which have been subjected to various interesterification reactions such, for example, as interesterified lard and mixtures of triglycerides having a variety of fatty acid radicals in their structures. These shortenings may also contain mono- and diglycerides, acetin-containing triglycerides, substantially fully hydrogenated hard stock, and various other agents or emulsifiers such, for example, as the free fatty acids derived from edible oil, polyoxyethylene esters of fatty acids and certain fatty acid esters of polyhydric alcohols.

Dry shortening compositions containing the anti-spattering agents of this invention can be used in pan frying of wet foods such as potatoes, chicken, eggs, fish, and the like. Pan frying with such shortenings produces a remarkable reduction in spattering with little or no foaming compared to the same shortenings without the said antispattering agents. Deep frying of wet foods in shortenings containing these agents exhibits a comparable reduction in foaming.

The said improved dry shortening compositions are also satisfactory for the other common uses of shortening such as the baking of cakes, cookies, pies, biscuits, waffles, and bread. As an example, a high-ratio quick method white cake was prepared by mixing together the following ingredients in the stated amounts:

190 grams cake flour
267 grams granulated sugar
3 grams salt
100 grams shortening
160 grams whole milk The said mixture was blended together with a Sunbeam Mixer for two minutes, and to the blend was added 11.55 grams of baking powder. Blending was continued for another half minute, and then to the blend was added 80 grams of whole milk, 120 grams of fresh egg whites and 5 cc. of vanilla extract. The complete mixture was then blended for an additional two minutes until a satisfactory batter was obtained. The final batter in an amount of 400 grams was placed in an 8-inch pan and heated in an oven at 365° F. for 25 minutes.

A cake baked according to the said procedure with a shortening consisting of about 94% of a mixture of 17 parts of soybean oil and 3 parts of cottonseed oil hardened to an Iodine Value of about 70 and blended with about 6% of saturated cottonseed oil and having 0.5% sorbitol monopalmitate added thereto, had a good appearance, had good eating qualities with respect to its light and tender texture, and had a volume comparable to a similar cake baked with the same shortening containing no sorbitol monopalmitate.

Pie crusts made with a hydrogenated vegetable oil shortening consisting primarily of hydrogenated soybean oil (I.V. 70–75) and minor amounts of hardstock and monoglyceride emulsifiers and having 0.75% sorbitol monopalmitate added thereto, were also comparable in eating qualities, with respect to tenderness and flavor, to those made with the same shortening containing no sorbitol monopalmitate.

What is claimed is:

1. A dry shortening composition having improved antispattering properties when used in frying comprising a fatty triglyceride and a partial ester of a compound selected from the group consisting of straight chain pentitols and hexitols with fatty acid having a chain length of from about 12 to about 22 carbon atoms, said ester having at least 4 unesterified and uncombined hydroxyl groups present in the molecule and being present in an amount of from about 0.3% to about 0.9% by weight of the composition but insufficient to cause substantial foaming.

2. The composition according to claim 1 wherein the fatty acid radical of the partial ester is derived from a fatty material selected from the group consisting of cottonseed oil, soybean oil, palm oil, peanut oil, coconut oil, rapeseed oil, sunflower seed oil, lard, tallow and mixtures thereof.

3. The composition according to claim 1 wherein the polyol radical of the partial ester is derived from sorbitol.

4. The composition according to claim 1 wherein the fatty acid radical of the partial ester is derived from a fatty material selected from the group consisting of cottonseed oil, soybean oil, palm oil, peanut oil, coconut oil, rapeseed oil, sunflower seed oil, lard, tallow and mixtures thereof, and wherein the polyol radical of the partial ester is derived from sorbitol.

5. The composition according to claim 1 wherein the partial ester is sorbitol monopalmitate.

6. A dry shortening composition having improved antispattering properties when used in frying comprising a fatty triglyceride and a partial ester of a compound selected from the group consisting of straight chain pentitols and hexitols with fatty acid having a chain length of from about 12 to about 22 carbon atoms, said ester having at least four unesterified and uncombined hydroxyl groups present in the molecule and being present in an amount of from about 0.7% to about 0.8% by weight of the composition but insufficient to cause substantial foaming.

7. The composition according to claim 6 wherein the fatty acid radical of the partial ester is derived from a fatty material selected from the group consisting of cottonseed oil, soybean oil, palm oil, peanut oil, coconut oil, rapeseed oil, sunflower seed oil, lard, tallow and mixtures thereof.

8. The composition according to claim 6 wherein the polyol radical of the partial ester is derived from sorbitol.

9. The composition according to claim 6 wherein the fatty acid radical of the partial ester is derived from a fatty material selected from the group consisting of cottonseed oil, soybean oil, palm oil, peanut oil, coconut oil, rapeseed oil, sunflower seed oil, lard, tallow and mixtures thereof, and wherein the polyol radical of the partial ester is derived from sorbitol.

10. The composition according to claim 6 wherein the partial ester is sorbitol monopalmitate.

References Cited in the file of this patent

UNITED STATES PATENTS

| | | |
|---|---|---|
| 2,611,704 | Jaeger | Sept. 23, 1952 |
| 2,694,643 | Robinson et al. | Nov. 16, 1954 |

OTHER REFERENCES

Bailey: "Industrial Oil and Fat Products," 1951, Interscience Publishers, Inc., N.Y. p. 11.